(12) United States Patent
Yang et al.

(10) Patent No.: US 9,879,142 B2
(45) Date of Patent: Jan. 30, 2018

(54) MICROENCAPSULATION OF ORGANIC SILANES AND THEIR USE AS SELF HEALING MATERIALS

(71) Applicant: NANYANG TECHNOLOGICAL UNIVERSITY, Singapore (SG)

(72) Inventors: Jinglei Yang, Singapore (SG); Mingxing Huang, Singapore (SG)

(73) Assignee: NANYANG TECHNOLOGICAL UNIVERSITY, Singapore (SG)

(*) Notice: Subject to any disclaimer, the term of this patent is extended or adjusted under 35 U.S.C. 154(b) by 378 days.

(21) Appl. No.: 14/385,037

(22) PCT Filed: Mar. 13, 2013

(86) PCT No.: PCT/SG2013/000105
§ 371 (c)(1),
(2) Date: Sep. 12, 2014

(87) PCT Pub. No.: WO2013/137828
PCT Pub. Date: Sep. 19, 2013

(65) Prior Publication Data
US 2015/0079290 A1 Mar. 19, 2015

Related U.S. Application Data

(60) Provisional application No. 61/610,218, filed on Mar. 13, 2012.

(51) Int. Cl.
| | |
|---|---|
| C09D 5/08 | (2006.01) |
| B01J 13/18 | (2006.01) |
| C09D 161/24 | (2006.01) |
| C09D 183/08 | (2006.01) |
| C08G 77/24 | (2006.01) |
| C08L 61/24 | (2006.01) |
| C08L 83/08 | (2006.01) |
| C08K 5/54 | (2006.01) |
| C08K 5/5419 | (2006.01) |

(52) U.S. Cl.
CPC .............. *C09D 5/086* (2013.01); *B01J 13/18* (2013.01); *C08G 77/24* (2013.01); *C08K 5/5406* (2013.01); *C08K 5/5419* (2013.01); *C08L 61/24* (2013.01); *C08L 83/08* (2013.01); *C09D 161/24* (2013.01); *C09D 183/08* (2013.01)

(58) Field of Classification Search
CPC ........ C09D 5/086; C08K 5/5406; C08L 61/24
See application file for complete search history.

(56) References Cited

U.S. PATENT DOCUMENTS 6,361,871 B1 3/2002 Jenkner et al.
2011/0057340 A1 3/2011 Perichaud et al.

OTHER PUBLICATIONS

Li (Applied Surface Science 225 (2008) 1894-1900).*
Agus Prasetya Rochmadi, et al., "Mechanism of Microencapsulation with Urea-Formaldehyde Polymer", American Journal of Applied Sciences, 2010, pp. 739-745, vol. 7, No. 6.
Sonja Then, et al., "Performance of Melamine Modified Urea-Formaldehyde Microcapsules in a Dental Host Material", Journal of Applied Polymer Science, 2011, pp. 2557-2562, vol. 122.
H. Yang, "Nanoencapsulation of blocked isocyanates through aqueous emulsion polymerization", eXPRESS Polymer Letters, 2008, pp. 349-356, vol. 2, No. 5.
In Woo Cheong, et al., "Synthesis of core-shell polyurethane-urea nanoparticles containing 4,4'-methylenedi-p-phenyl diisocyanate and isophorone diisocyanate by self-assembled neutralization emulsification", Chem. Commun., Sep. 14, 2004, pp. 2484-2485.
Biswajit Ghosh, et al., "Self-Repairing Oxetane-Substituted Chitosan Polyurethane Networks", Science, Mar. 13, 2009, pp. 1458-1460, vol. 323.
Mary M. Caruso, et al., "Robust, Double-Walled Microcapsules for Self-Healing Polymeric Materials", Applied Materials & Interfaces, 2010, pp. 1195-1199, vol. 2, No. 4.
B.J. Blaiszik, et al., "Nanocapsules for self-healing materials", Composites Science and Technology, 2008, pp. 978-986, vol. 68.
Fen Zhang, et al., "Preparation of superhydrophobic films on titanium as effective corrosion barriers", Applied Surface Science, 2011, pp. 2587-2591, vol. 257.
Jinglei Yang, et al., "Microencapsulation of Isocyanates for Self-Healing Polymers", Macromolecules, 2008, pp. 9650-9655, vol. 41.
Joseph D. Rule, et al., "Effect of microcapsule size on the performance of self-healing polymers", Polymer, 2007, pp. 3520-3529, vol. 48.
Yang Li, et al., "Bioinspired Self-Healing Superhydrophonic Coatings", Angewandte Chemie, 2010, pp. 6129-6133, vol. 49.
S.J. Garcia, et al., "Self-healing anticorrosive organic coating based on an encapsulated water reactive silyl ester: Synthesis and proof of concept", Progress in Organic Coatings, 2011, pp. 142-149, vol. 70.
Soo Hyoun Cho, et al., "Polydimethylsiloxane-Based Self-Healing Materials", Advanced Materials, 2006, pp. 997-1000, vol. 18.
Soo Hyoun Cho, et al., "Self-Healing Polymer Coatings", Advanced Materials, 2009, pp. 645-649, vol. 21.

(Continued)

*Primary Examiner* — Kuo-Liang Peng
(74) *Attorney, Agent, or Firm* — Sughrue Mion, PLLC

(57) ABSTRACT

The disclosure provides a poly(urea-formaldehyde) microcapsule, which comprises encapsulated in the poly(urea-formaldehyde) microcapsule an organofluorine silane of the general formula (I) $A_3C(CA_2)_mSiR^1{}_yX_{(3-y)}$ (I), wherein in formula (I) A is either fluorine (F) or hydrogen (H), wherein at least 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, n=0 or 2, y=0 or 1 or 2 and m=0 to 20, encapsulated within the microcapsule. The disclosure also provides self-healing coating compositions comprising such polymeric microcapsules and methods of preventing or slowing corrosion using such coating compositions.

18 Claims, 9 Drawing Sheets

(56) References Cited

OTHER PUBLICATIONS

Mingxing Huang, et al., "Facile microencapsulation of HDI for self-healing anticorrosion coatings", Journals of Materials Chemistry, 2011, pp. 11123-11130, vol. 21.

Li Yuan, et al., "Preparation and characterization of poly(urea-formaldehyde) microcapsules filled with epoxy resins", Polymer, 2006, pp. 5338-5349, vol. 47.

David A. McIlroy, et al., "Microencapsulation of a Reactive Liquid-Phase Amine for Self-Healing Epoxy Composites", Macromolecules, 2010, pp. 1855-1859, vol. 43.

C. Suryanarayana, et al., "Preparation and characterization of microcapsules containing linseed oil and its use in self-healing coatings", Progress in Organic Coatings, 2008, pp. 72-78, vol. 63.

M. R. Kessler, et al., "Self-healing structural composite materials", Composites Part A: applied science and manufacturing, 2003, pp. 743-753, vol. 34.

E. N. Brown, et al., "In situ poly(urea-formaldehyde) microencapsulation of dicyclopentadiene", Journal of Microencapsulation, 2003, pp. 719-730, vol. 20, No. 6.

Kathleen S. Toohey, et al., "Self-healing materials with microvascular networks", Nature Materials, Aug. 2007, pp. 581-585, vol. 6.

H. R. Williams, et al., "Self-healing composite sandwich structures", Smart Materials and Structures, 2007, pp. 1198-1207, vol. 16.

R.S. Trask, et al., "Biomimetic self-healing of advanced composite structures using hollow glass fibres", Smart Materials and Structures, 2006, pp. 704-710, vol. 15.

S. R. White, et al., "Autonomic healing of polymer composites", Nature, Feb. 2001, pp. 794-797, vol. 409.

Richard P. Wool, "Self-healing materials: a review", Soft Matter, 2008, pp. 400-418, vol. 4.

R. S. Trask, et al., "Self-healing polymer composites: mimicking nature to enhance performance", Bioinspiration & Biomimetics, 2007, pp. P1-P9, vol. 2.

Dong Yang Wu, et al., "Self-healing polymeric materials: A review of recent developments", Progress in Polymer Science, 2008, pp. 479-522, vol. 33.

Swapan Kumar Ghosh, "Self-healing Materials: Fundamentals, Design Strategies, and Applications", 2009, 28 pages.

Jay A. Syrett, et al., "Self-healing and self-mendable polymers", Polymer Chemistry, 2010, pp. 978-987, vol. 1.

Sybrand Van Der Zwaag, "Self Healing Materials, An Alternative Approach to 20 Centuries of Materials Science", Springer Series in Materials Science 100, 2007, 391 pages, Springer, Dordrecht, The Netherlands.

R. L. Twite, et al., "Review of Alternatives to chromate for corrosion protection of aluminum aerospace alloys", Progress in Organic Coatings, 1998, pp. 91-100, vol. 33.

Tammy L. Metroke, et al., "Passivation of metal alloys using sol-gel-derived materials—a review", Progress in Organic Coatings, 2001, pp. 233-238, vol. 41.

Duhua Wang, et al., "Sol-gel coatings on metals for corrosion protection", Progress in Organic Coatings, 2009, pp. 327-338, vol. 64.

Hongxia Wang, et al., "Durable, Self-Healing Superhydrophobic and Superoleophobic Surfaces from Fluorinated-Decyl Polyhedral Oligomeric Silsesquioxane and Hydrolyzed Fluorinated Alkyl silane", Angewandte Chemie, 2011, pp. 11433-11436, vol. 50.

Haiyan Li, et al., "Surface modification of self-healing poly(urea-formaldehyde) microcapsules using silane-coupling agent", Applied Surface Science, 2008, pp. 1894-1900, vol. 255.

Rongguo Wang, et al., "Surface Modification of Poly(urea-formaldehyde) Microcapsules and the Effect on the Epoxy Composites Performance", Journal of Macromolecular Science, Part A: Pure and Applied Chemistry, 2010, pp. 991-995, vol. 47.

Haiyan Li, et al., "Toughening Self-healing Epoxy Resin by Addition of Microcapsules", Polymers & Polymer Composites, 2011, pp. 223-226, vol. 19, Nos. 2 & 3.

E. N. Brown, et al., "In situ poly(urea-formaldehyde) microencapsulation of dicyclopentadiene", Journal of Microencapsulation, Nov.-Dec. 2003, pp. 719-730, vol. 20, No. 6.

B. J. Blaiszik, et al., "Self-Healing Polymers and Composites", Annual Review of Materials Research, 2010, pp. 179-211, vol. 40.

International Search Report for PCT/SG2013/000105 dated May 24, 2013 [PCT/ISA/210].

\* cited by examiner

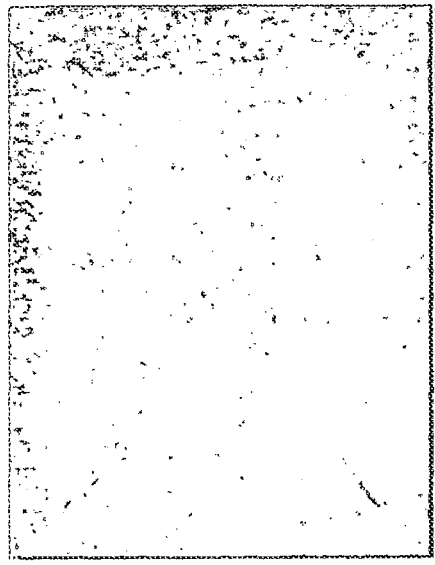
Fig. 2a
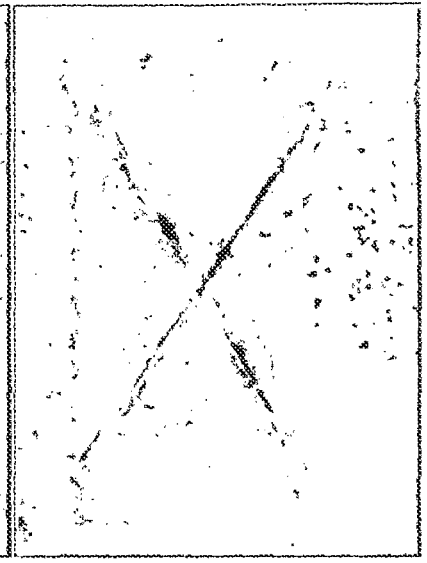
Fig. 2b
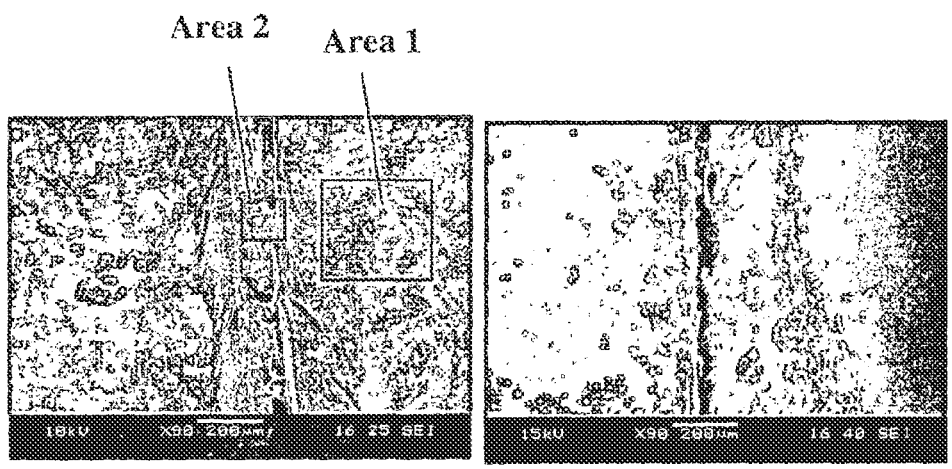
Fig. 2c
Fig 2d

MICROENCAPSULATION OF ORGANIC SILANES AND THEIR USE AS SELF HEALING MATERIALS

CROSS REFERENCE TO RELATED APPLICATIONS

This application is a National Stage of International Application No. PCT/SG2013/000105, filed on Mar. 13, 2013, which claims priority from U.S. Provisional Patent Application No. 61/610,218 filed on Mar. 13, 2012, the contents of all of which are incorporated herein by reference in their entirety.

FIELD OF THE INVENTION

The present invention relates generally to microcapsules and a method of microencapsulating an organofluorine silane as core material. The invention also relates to a method for microencapsulation of organofluorine silane in a poly(urea-formaldehyde) microcapsule/shell by means of an in-situ polymerization process in an oil-in-water emulsion system. The invention also provides a process for manufacturing a self-healing anticorrosion coating and a respective coating composition. In accordance with the process of making a self-healing anticorrosion coating, the microcapsules described herein may be dispersed in a resin to yield a self-healing coating. The self-healing effect can be used for corrosion protection application.

BACKGROUND OF THE DISCLOSURE

Self-healing materials have received considerable attention due to their great potential to diminish degradation and reduce the maintenance cost. Since the first generation self-healing material based on the ring opening metathesis polymerization (ROMP) of encapsulated dicyclopentadiene (DCPD) in the presence of Grubbs' catalyst particles (S. R. White, N. R. Sottos, P. H. Geubelle, J. S. Moore, M. R. Kessler, S. R. Sriram, E. N. Brown and S. Viswanathan, Nature, 2001, 409, 794-797) microencapsulation has been one of the most efficient and widely used approaches in self-healing materials development. Poly(urea-formaldehyde) (PUF) microcapsules containing DCPD as healing agent were prepared through an an in situ polymerization in oil-in-water emulsion (E. Brown, M. Kessler, N. Sottos and S. White, J. Microencapsulation, 2003, 20, 719-730; M. R. Kessler, N. R. Sottos and S. R. White, Composites: Part A, 2003, 34, 743-753) and the capsules size was further reduced to nanometre scale with the assistance of a sonication technique (B. J. Blaiszik, N. R. Sottos and S. R. White, Compos. Sci. Technol., 2008, 68, 978-986). Linseed oil (C. Suryanarayana, K. C. Rao and D. Kumar, Prog. Org. Coat., 2008, 63, 72-78), amines (D. A. McIlroy, B. J. Blaiszik, M. M. Caruso, S. R. White, J. S. Moore and N. R. Sottos, Macromolecules, 2010, 43, 1855-1859) and epoxy resins (L. Yuan, G. Liang, J. Xie, L. Li and J. Guo, Polymer, 2006, 47, 5338-5349) were also microencapsulated for self-healing applications. To avoid the contamination of catalyst by the host matrix, a dual capsule system was reported (S. Cho, H. Andersson, S. White, N. Sottos and P. Braun, Adv. Mater., 2006, 18, 997-1000; S. H. Cho, S. R. White and P. V. Braun, Adv. Mater., 2009, 21, 645-649) and this approach has shown good self-healing and corrosion protection features. Most of the capsules applied for self-healing purpose so far were made from PUF, polyurethane (PU) and polyurea. As an alternative, a double-walled polyurethane-poly(urea formaldehyde) (PU-PUF) microcapsule was recently developed through the combination of interfacial polymerization of PU and in situ polymerization of PUF in a single batch reaction (M. M. Caruso, B. J. Blaiszik, H. Jin, S. R. Schelkopf, D. S. Stradley, N. R. Sottos, S. R. White and J. S. Moore, ACS Appl. Mater. Interfaces, 2010, 2, 1195-1199.) Other approaches such as hollow glass fiber embedment, microvascular system, and electrospun hollow fibers have also been extensively investigated for self-healing materials development, and more recently there was reported an oxetane-substituted chitosan precursor incorporated PU showing good scratch closure performance within half an hour under sunlight (B. Ghosh and M. Urban, Science, 2009, 323, 1458-1460).

Since isocyanates are reactive with moisture and can thus be used as a potential healing agent to develop one-part, catalyst-free self-healing materials that are exposed to moist or aqueous environments, their suitability as self-healing materials has been rather extensively. Early research on encapsulation of isocyanate has been mainly restricted to its blocked form or solid state (I. W. Cheong and J. H. Kim, Chem. Commun., 2004, 2484-2485; H. Yang, S. Mendon and J. Rawlins, eXPRESS Polym. Lett., 2008, 2, 349-356) while Yang et, al. for the first time reported in Macromolecules, 2008, 41, 9650-9655, the microencapsulation of liquid isocyanate monomer. Less reactive isophorone diisocyanate (IPDI) was encapsulated by polyurethane microcapsules based on the polymerization of toluene diisocyanate (TDI) prepolymer that was cautiously in-house synthesized.

Silanes are a further class of potential seal-healing materials. However, to date, the research on organic silane for self-healing materials remains largely unexplored, and only a few publications have appeared. Braun and co-workers reported the polydimethylsiloxane (PDMS)-based silane microcapsules applied for self-healing coatings (S. H. Cho, S. R. White, P. V. Braun, Advanced Materials 2009, 21, 645 and S. Cho, H. Andersson, S. White, N. Sottos, P. Braun, Advanced Materials 2006, 18, 997). A mixture of hydroxyl end-functionalized PDMS (HOPDMS) and polydiethoxysiloxane was directly phase-separated, or encapsulated and then dispersed in epoxy matrix, and the yielding coating exhibited good self-healing ability. However, organo-tin catalyst was necessary for such self-healing system. Another example is the microencapsulation of a self-synthesized silyl ester for self-healing coatings reported by S. J. García, H. R. Fischer, P. A. White, J. Mardel, Y. González-García, J. M. C. Mol, A. E. Hughes, Progress in Organic Coatings, 70, 142. Octyldimethylsilyloleate (silyl ester) was synthesized and encapsulated into poly(urea-formaldehyde) (PUP) microcapsules, which were then incorporated into epoxy coating to produce a self-healing coating the self-healing properties of which were demonstrated.

However, there is still a need to provide further self-healing materials and microcapsules that are suitable for the microencapsulation of such self-healing materials.

SUMMARY OF THE INVENTION

The present invention addresses these needs by providing new and improved microcapsules, coating compositions comprising such microcapsules and methods for preventing or lowering the grade of corrosion.

In a first aspect, the disclosure provides a poly(urea-formaldehyde) microcapsule, the poly(urea-formaldehyde) microcapsule comprising encapsulated within the microcapsule an organofluorine silane of the general formula (I) $A_3C(CA_2)_mSiR^1_yX_{(3-y)}$ (I), wherein in formula (I) A is either fluorine (F) or hydrogen (H), wherein at least about 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 1 or 2 and m=0 to 20.

In a second aspect, the disclosure provides a method of encapsulating an organofluorine silane of the general formula (I) $A_3C(CA_2)_mSiR^1_yX_{(3-y)}$(I), wherein in formula (I) A is either fluorine (F) or hydrogen (H), wherein at least about 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 1 or 2 and m=0 to 20 in a polymer microcapsule, the method comprising:
forming an oil-in-water emulsion containing a mixture of urea and the organofluorine silane of the general formula (I),
adding formaldehyde to the oil-in-water emulsion, and
polymerizing urea and formaldehyde by in-situ polymerization to form the polymeric microcapsule, thereby encapsulating the organofluorine silane of the general formula (I) in the formed polymeric microcapsule.

In a third aspect, the disclosure provides a method of preventing or slowing corrosion, the method comprising applying a coating composition on a substrate, wherein the coating composition comprises polymeric microcapsules consisting of a polymerization product of methylene diphenyl diisocyanate (MDI) prepolymer with a polyol, the microcapsule comprising a liquid isocyanate compound encapsulated within the microcapsule.

In a fourth aspect, the disclosure provides a coating composition comprising poly(urea-formaldehyde) microcapsules, the poly (urea-formaldehyde) microcapsules comprising encapsulated therein an organofluorine silane of the general formula (I) $A_3C(CA_2)_mSiR^1_yX_{(3-y)}$ (I), wherein in formula (I) A is either fluorine (F) or hydrogen (H), wherein at least about 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 1 or 2 and m=0 to 20.

In yet another aspect, the disclosure provides a method of preventing or slowing corrosion, the method comprising applying a coating composition on a substrate, wherein the coating composition comprises hexamethylene diisocyanate encapsulated within the microcapsule.

In yet another aspect, the disclosure provides the use of an organofluorine silane of the general formula (I) $A_3C(CA_2)_m SiR^1_yX_{(3-y)}$ (I) as self-healing material, wherein in formula (I) A is either fluorine (F) or hydrogen (H), wherein at least about 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 1 or 2 and m=0 to 20.

DESCRIPTION OF THE DRAWINGS

The invention will be better understood with reference to the detailed description when considered in conjunction with the non-limiting examples and the accompanying drawings, in which:

FIG. 1 shows the characterization of poly(urea-formaldehyde) (PUF) microcapsules of an embodiment of the invention.

FIG. 2 shows the characterization of a self-healing coating of an embodiment of the invention. FIG. 2a shows an optical image of a self-healing coating that consisting of an epoxy matrix containing 10 wt.-% POTS-filled PUF microcapsules of an embodiment of the invention after 48 h immersion in 10 wt % NaCl solution, while FIG. 2b shows a control coating, consisting of neat epoxy matrix, after 48 h immersion in 10 wt % NaCl solution, FIG. 2c shows an SEM image of the scribed regions of the self-healing epoxy coating of the invention and FIG. 2d shows an SEM image of a control epoxy coating after immersion.

FIG. 3 illustrates the electrochemical testing and the self-healing mechanism of a self-healing coating of the invention. FIG. 4) or a mixed chloroalkoxysilane is used as self-healing material.

FIG. 4 shows commercially available illustrative fluorinated silanes of general formula (I) as defined herein that can be used as encapsulated self-healing material of the invention.

DETAILED DESCRIPTION

Figure 1A:
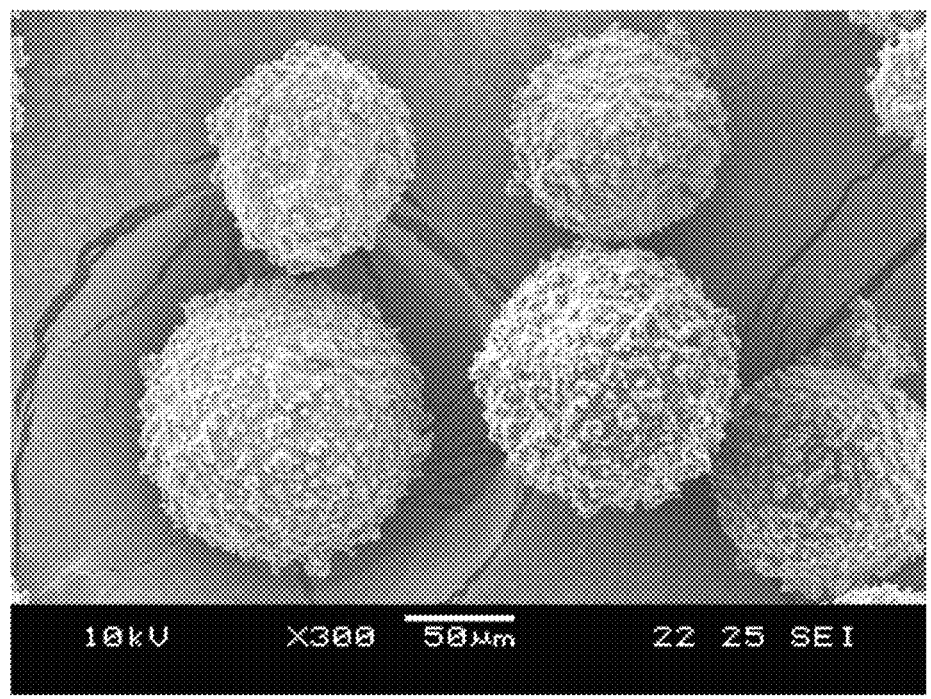
FIG. 1a shows a scanning electron microscope (SEM) image of prepared PUF microcapsules in which 1H,1H,2H, 2H'-perfluorooctyltriethoxysilane (POTS) has been encapsulated.

The present invention provides a poly(urea-formaldehyde) microcapsule that comprises encapsulated therein an organofluorine silane (a fluorinated silane) of the general formula (I) $A_3C(CA_2)_mSiR^1_yX_{(3-y)}$ (I), wherein in formula (I) A is either fluorine (F) or hydrogen (H), wherein at least 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 1 or 2 and m=0 to 20.

Such microcapsule containing a fluorinated silane of formula (I) and a self-healing anticorrosive polymeric coating based on such microencapsules possess a number of advantages over the existing self-healing coatings. Fluorinated silanes such as 1H,1H,2H,2H-perfluorooctyltriethoxysilane (POTS; Chemical Abstracts (CAS) No. 51851-37-7), 1H,1H,2H,2H-Perfluorodecyltriethoxysilane (CAS No. 101947-16-4), 1H,1H,2H,2H-Perfluorodecyltrimethoxysilane (CAS No. 83048-65-1) 1H,1H,2H,2H-Perfluorodecyl-trichlorosilane (CAS No: 78560-44-8), (3,3,4,4,5,5,6,6,6-nonafluorohexyl)-trichlorosilane (CAS No. 78560-47-1) are a) able to hydrolyze in an wet environment to form a silane-based film (this ability indicates that the use of catalyst can be avoided in the final self-healing system; b) the film produced from hydrolysis and poly-condensation of these fluorinated silanes is superhydrophobic (this special wetting property will serve to repel aqueous electrolyte solution away from metal when the film is formed, providing further corrosion protection to metal substrate; c) such fluorinated silanes are commercially available and hence the preparation of self-healing coating will be more convenient and time efficient. Thus, the invention also encompasses the use of an organofluorine silane of the general formula (I) as defined herein as self-healing material.

Any suitable fluorinated silane of formula (I) as defined herein can be encapsulated in the poly(ureaformaldehyde) based microcapsule, as long as the chosen reaction conditions allow the encapsulation of the fluorinated silane in the (formed) microcapsule. The silane can be used alone or in combination with any other silane of formula (I) described here. Fluorinated silanes of formula (I) are known in the art, for example, from U.S. Pat. No. 6,361,871. Illustrative examples of silanes of formula (I) include those shown in FIG. 4, i.e, for example 1H,1H,2H,2H-perfluorooctyltri-ethoxysilane, 1H,1H,2H,2H'-perfluorooctyltrimethoxysilane, 1H,1H,2H,2H-Perfluorodecyltriethoxysilane, 1,1,2,2,3,3,4,4,5,5,6,6,7,7,8,8,9-heptadecafluorododecyl(trimethoxy)silane, 1,1,2,2,3,3,4,4,5,5,6,6,7,7,8,8,9-heptadecafluorododecyl(triethoxy)silane, triethoxy(1,1,2,3,3,4,4,5,5,6,6,7,7,8,8-hexadecafluorooctyl)silane, trimethoxy(1,1,2,3,3,4,4,5,5,6,6,7,7,8,8-hexadecafluorooctyl)silane, 1H,1H,2H,2H-perfluorooctyltrichlorosilane or 1H,1H,2H,2H-Perfluorodecyltrichlorosilane. Such fluorinated silanes are commercially available from various suppliers such as Sigma-Aldrich St. Louis, Mo., USA, aber GmbH & Co, KG Karlsruhe, Germany or Fluorochem Ltd., Derbyshire, United Kingdom.

The silane compound can either be compound that is (a) liquid under the conditions chosen for the encapsulation process or a compound which is as such (a) solid but can be liquefied within the encapsulation process. For example, a solid silane might be dissolved in a reaction mixture used for the encapsulation process. After encapsulation, the silane is usually in the liquid state. This allows the microcapsules to be used for seal-healing applications, in which the silane exits from the capsule, once the shell of the capsule is ruptured or damaged, for example, by physical or mechanical interaction or by a chemical process, and then reacts, for example, with moisture from the environment to form a protective polymer.

In typical embodiments, a organofluorine silane of the general formula (I) $A_3C(CA_2)_mSiR^1_yX_{(3-y)}$ (I) is used, wherein in formula at least about 55% of atoms A (that means the atoms of the alkyl chain of the silane of formula (I), about 60% of atoms A, about 65% of atoms A, about 70% of atoms A, about 75% of atoms A, about 80% of atoms A, about 85% of atoms A, about 90% of atoms A, or about 95% of atoms A are fluorine. It is also possible that all atoms A (that means 100% of atoms A are fluorine). In illustrative example, the alkyl chain of POTS (cf. FIG. 4a) has 17 atoms A, 4 of which are hydrogen atoms and 13 of which are fluorine atoms. Thus, $(13/17)\times100\%=76.5\%$ of atoms A in POTS are fluorine. In another example, (1,1,2,2,3,3,4,4,5-nonafluorohexyl)triethoxysilane (cf. FIG. 4g) has 13 atoms A, of which 9 are fluorine and 4 are hydrogen. Thus, $(9/13)\times100\%=69.2\%$ of atoms A in (1,1,2,2,3,3,4,4,5-nonafluorohexyl)triethoxysilane are fluorine. Likewise, (3,3,4,4,5,5,6,6,6-nonafluorohexyl)trichlorosilane (cf. FIG. 4j) has 13 atoms A of which 4 are hydrogen and 9 are fluorine, so that also in this compound 69.2% of atoms A are fluorine.

In some embodiments of the invention, a silane of formula I is used in which m is any integer from 4 to 18, that means m can be 4, 5, 6, 7, 8, 9, 10, 11, 12, 13, 14, 15, 16, 17 or 18. In silanes of formula (I) the substituent R of the group RO can be any linear or branched alkyl radical of 1 to 4 carbon atoms, i.e. methyl, ethyl, propyl, isopropyl, butyl or isopropyl. Likewise, the group $R^1$ in the silanes of formula (I) can be any linear, branched or cyclic alkyl group of 1 to 8 carbon atoms, including, but not limited to, methyl, ethyl, propyl, isopropyl, butyl or isopropyl, pentyl, isopentyl, neopentyl, hexyl, 2-hexyl, cyclohexyl, heptyl, cycloheptyl, octyl or cyclooctyl.

In some embodiments of the invention, a silane of the general formula $F_3C(CF_2)_m(CH_2)_nSiR^1_yX_{(3-y)}$ (II) is used, wherein in formula (II) X is chloro or a group RO and R is a linear or branched alkyl radical of 1 to 4 carbon atoms, $R^1$ is a linear, branched or cyclic alkyl group of 1 to 8 carbon atoms as defined above, n=0, 1 or 2, y=0 or 1 or 2 and m=0 to 18. Such silanes are, for example, described in U.S. Pat. No. 6,361,871. In some of the embodiments of silanes of formula (II) m is any integer from 4 to 16 (including m=5, 6, 7, 8, 9, 10, 11, 12, 13, 14 and 15), n is 0, 1, or 2 and y=0, 1 or 2. Illustrative examples of such compounds include, but are not limited to, 3,3,4,4,5,5,6,6,7,7,8,8,8-tridecafluorooctyl-trimethoxysilane, 3,3,4,4,5,5,6,6,7,7,8,8,8-tridecafluorooctyl-trichlorosilane, 3,3,4,4,5,5,6,6,7,7,8,8,8-tridecafluorooctyltriethoxysilane, 3,3,4,4,-5,5,6,6,7,7,8,8,9,9,10,10,10-heptadecafluorodecyl-triethoxysilane, 3,3,4,4,5,5,6,6,7,7,8,8,9,9,-10,10,10-heptadecafluorodecyl-trichlorosilane 3,3,-4,4,5,5,6,6,7,7,8,8,9,9,10,10,10-heptadecafluoro-decyltrimethoxysilane, 3,3,4,4,5,5,6,6,6-nonafluorohexyltriethoxysilane, 3,3,4,4,5,5,6,6,6-nonafluorohexyltrimethoxysilane, 3,3,4,4,5,5,6,6,6-nonafluorohexyltrichlorosilane, 3,3,4,4,5,5,6,6,7,7,8,8,9,9,10,10,10,11,11,12,12,12-heneicosafluorododecyltri-ethoxysilane, 3,3,3-tri-fluoropropyltrichlorosilane, 3,3,3-trifluoropropyltrimethoxysilane, 3,3,3-trifluoropropyltriethoxysilane or 3-(1,1,2,2-tetrafluoroethoxy)propyltrimethoxysilane or 3-(1,1,2,2-tetrafluoroethoxy)propyltrichlorosilane.

Any poly(urea-formaldehyde) microcapsule can be used for the encapsulation of the silane of formula (I). The poly(urea-formaldehyde) microcapsule may, for example, by made by polymerization of monomeric urea with monomeric formaldehyde as described by E. Brown, M. Kessler, N. Sottos, S. White, Journal of Microencapsulation 2003, 20, 719. The urea can also be replaced by melamine, for example, by up to 5% melamine, for example, or wherein the microcapsule is made by polymerization of a mixture of melamine and urea with formaldehyde as described by Then at al J. Appl. Polym. Sci. 122: 2557-2562, 2011, for example. In these methods, the same core material is encapsulated in-situ during the formation of the poly(urea-formaldehyde) microcapsule. In addition, as described by Rochmadi, A. P. & Wahyu Hasokowati, American Journal of Applied Sciences 7 (6): 739-745, 2010, it is also possible to first prepare a urea-formaldehyde pre-polymer and carry out the (micro)encapsulation process in which an emulsion is first formed and the microcapsule shell is formed thereafter while encapsulating the silane.

The poly(urea-formaldehyde) microcapsule can be of any suitable size and the diameter of the microcapsule can be controlled, for example, by adjusting the rotation speed, for example, during in-situ polymerization as described in. In typical embodiments the microcapsule has a diameter between about 10 μm to about 500 μm or about 1000 μm, for example of about 20 μm, about 40 μm, about 50 μm, about 80 μm, about 100 μm, about 150 μm, about 200 μm, about 250 μm, about 300 μmm about 400 μm or about 450 μm.

Accordingly, the invention also provides a method of encapsulating a silane of formula (I) as defined herein in a polymer microcapsule. This method comprises:
forming an oil-in-water emulsion containing a mixture of urea and the organofluorine silane of the general formula (I),
adding formaldehyde to the oil-in-water emulsion, and
polymerizing urea and formaldehyde by in-situ polymerization to form the polymeric microcapsule, thereby encapsulating the organofluorine silane of the general formula (I) in the formed polymeric microcapsule.

In this method, forming the oil-in-water emulsion may comprise adding urea and the organofluorine silane of the general formula (I) to an aqueous solution containing a surfactant. Any surfactant that is suitable for preparing a (stable) oil-in-water emulsion can be used in the method. Examples of suitable surfactants include ethylene maleic anhydride (EMA) copolymer or gum Arabic, polyvinyl alcohol, gellan gum, mesquite seed gum, gelatin, and mixtures thereof. The surfactant is typically present in a concentration up to the critical micelle concentration (CMC) of oil droplets in the oil-in-water emulsion and a suitable concentration can be determined empirically. An aqueous solution of formaldehyde is usually added to the oil-in-water emulsion that is then heated to a suitable temperature that allows the in-situ polymerization reaction to take place. The polymerization is carried out by maintaining the reaction mixture at a desired reaction temperature for a suitable period of time under agitation before the reaction is stopped by cooling down the reaction mixture, for example.

The microcapsules of the invention can be used for any self-healing application in which a polymer formed by hydrolysis of the silane of formula (I) after the silane being released from ruptured microcapsules is helpful. In one such embodiment, the microcapsules are used in a method of preventing or slowing corrosion. Such a method comprises applying a coating composition on a substrate, wherein the coating composition comprises (urea-formaldehyde) microcapsule comprising an organofluorine silane as defined herein encapsulated within the microcapsule. Again, any of the silanes that are mentioned above can be used in the method and in the coating compositions described here. Accordingly, the invention is also directed to a coating composition that comprises (urea-formaldehyde) microcapsule comprising an organofluorine silane of the general formula (I) $A_3C(CA_2)_mSiR^1_yX_{(3-y)}$ (I), in which A is either fluorine (F) or hydrogen (H), wherein at least about 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 1 or 2 and m=0 to 20, encapsulated within the microcapsule.

The microcapsules described here can be present in any desired amount in the coating composition. They are usually present in an amount which is capable of providing the desired effect of preventing or decreasing the rate of corrosion. In typical embodiments the microcapsules of the invention may be comprised in the coating composition in an amount of in between about 1 to about 50 wt. %, for example in about 2, 3, 4, 5, 6, 7, 8, 9, 10, 12, 15, or 20 wt. % of the total weight of the coating composition.

In embodiments of this method, the coating composition comprises a resin. The resin is typically a resin that is used for protective coatings or paints applied to substrates such as steel or other metals that are, for example, used in the marine and offshore industry, the automotive industry, the aviation industry or for building purposes. For this purpose, the microcapsules described here can be added to any resin that is used as protective coating, for example, against corrosion and/or mechanical abrasion. To name only a few, examples of resins are epoxy resin, an acrylic resin, a phenolic resin, a polyurethane resin, an alkyd resin and a polyester resin, which all commercially available from numerous suppliers, for example, from Cytec Industries Inc. 5 Garret Mountain Plaza, Woodland Park, N.J. 07424, U.S.A or from Bayer Material Science AG, Leverkusen, Germany.

Embodiments of this method may further comprise curing the coating composition after the coating composition has been applied to the substrate to be protected from corrosion such as a steel substrate. The curing depends on the type of resin used and can be carried out by any conventional method that is known to the person of average skill in the art.

EXAMPLES

The following examples are solely provided in order to demonstrate and further illustrate certain preferred embodiments and aspects of the present invention and are by no means to be construed as limiting the scope thereof.

1. Materials

Ethylene maleic anhydride was purchased from MP Biomedicals. Sodium hydroxide, sodium chloride, ammonium chloride, resorcinol, and formaldehyde solution were bought from Sigma-Aldrich. Two-part epoxy of Epolam 5015 resin and Epolam 5014 hardener was obtained from Axson. All chemicals in these experiments were used as received without further purification unless otherwise specified.

2. Experimentals

Synthesis of Microcapsules Containing Fluorinated Silane

The preparation of the poly(urea-formaldehyde) microcapsules was based on an in-situ, polymerization reaction ((in an oil-in-water emulsion system following the established method described by E. Brown, M. Kessler, N. Sottos, S. White, Journal of Microencapsulation 2003, 20, 719.

At ambient temperature, 50 ml of deionized water and 12.5 ml of 2.5 wt-% aqueous solution of ethylene maleic anhydride (EMA) copolymer were mixed in a 500 ml beaker. The beaker was suspended in a temperature-controlled water bath on a programmable hot plate with an external temperature probe. The solution was agitated with a digital mixer (Caframo) driving a three-bladed propeller. Under chosen agitation at 800 RPM (or any other value between 300 RPM and 1500 RPM, including 500 RPM, 1000 RPM, and 1200 RPM used here, see FIG. 1b), 1.25 g urea, 0.125 g ammonium chloride and 0.125 g resorcinol were dissolved in the solution. The pH of solution was raised from ~2.60 to 3.50 by drop-wise addition of 1M sodium hydroxide (NaOH) solution. 10 g POTS and toluene was then slowly added into the above aqueous solution to generate emulsion, followed by the addition of 3.17 g of 37 wt.-% aqueous solution of formaldehyde. The emulsion was covered and heated to 55° C. at a heating rate of 1° C./min. After 4 h of continuous agitation, the stirrer and hot plate were switched off. The resultant microcapsules were filtered and washed with distilled water. Microcapsules were collected for air-drying at room temperature for 48 hours before further analysis.

Morphology and Statistic Parameters of HDI Microcapsules

The surface morphology and shell thickness were examined by using scanning electron microscopy (JEOL JSM 5600LV SEM). Components of the microcapsules were analyzed by using Fourier Transfer Infrared Spectroscopy (DT-IR, Nicolet 6700), and the spectrum in the range of 400-4000 $cm^{-1}$ was used for the observation. The thermal stability and the POTS content of the resultant microcapsules were characterized by using thermogravimetric analysis (TGA, Hi-Res Modulated TGA 2950). The peak width of the derivative of the weight loss curve of capsules was used to roughly determine the core fraction of microcapsules.

Preparation of Expoxy Coating

Anticorrosive epoxy coating was prepared by dispersing 10 wt.-% of the synthesized microcapsules (diameter 120±33 μm) into epoxy resin (EPOLAM 5015, AXSON) at ambient temperature, followed by mixing hardener (EPOLAM 5014). The mixture was then evacuated to degas. The coating solution was then applied on steel with the final coating thickness of 200-250 μm, and cured at room temperature for 24 h before testing.

Cross scratches were applied manually on the prepared anticorrosive epoxy coating by razor blade. Scratched specimen was then immersed in 10 wt % NaCl solution for 48 h to evaluate the accelerated corrosion process. Pure epoxy coating was prepared as a control and treated in the same manner.

Optical photography was used to observe the different corrosion behaviors of the steel panel coated with self-healing coating and with neat epoxy control coating. SEM was also employed to inspect the evolution of the scratched area of the coating to provide detailed information about the corrosion process. Energy-dispersive X-ray spectroscopy (EDX) was employed to reveal the elemental distribution at the scribed area.

Figure 3A:
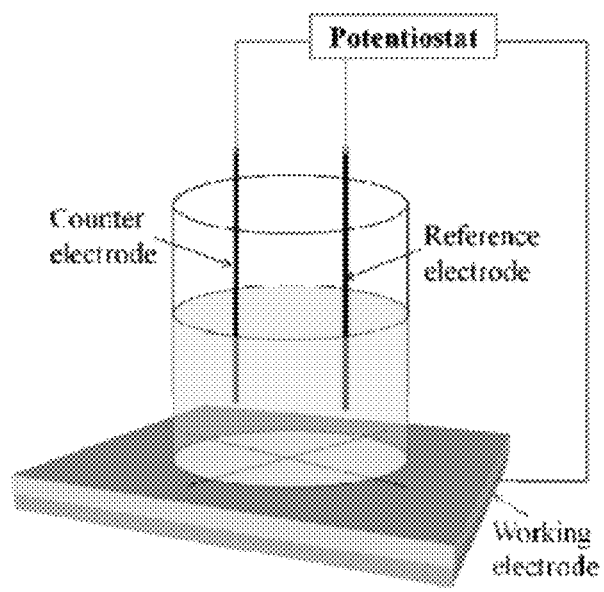
FIG. 3a depicts a schematic drawing of the three-electrode electrode system that was used for electrochemical testing of the coating of the invention shown in FIG. 2 when the immersion procedure was completed.

Electrochemical test was performed after the corrosion test to quantitatively evaluate the anticorrosion protection ability of the self-healing coating to steel substrate. The test was conducted using a computer controlled potentiostat (Reference 600, Gamry) in a conventional three-electrode electrochemical cell equipped with a Pt counter electrode, a Ag/AgCl in saturated KCl aqueous solution as reference electrode, and the coated steel panel as working electrode, respectively (FIG. 3a). The scribed region on the specimen was exposed to 1M NaCl aqueous electrolyte with the exposed area to be 10 $cm^2$. Potential (vs Potential of the reference electrode) was scanned from −600 mV to +1100 mV, and the current passing through the specimen was recorded.

3. Results and Discussion

Poly(urea-formaldehyde) (PUF) microcapsules containing POTS as core materials were synthesized via in-situ polymerization in an oil-in-water emulsion following the method of E. Brown, M. Kessler, N. Sottos, S. White, Journal of Microencapsulation 2003, 20, 719. The scanning electron microscopy (SEM) image in FIG. 1a clearly shows the spherical shape of the resultant PUF microcapsules, and it is seen that the microcapsules have a rough outer surface. This shell structure of the synthesized microcapsules is in good agreement with PUF microcapsules reported before.

Figure 1B:
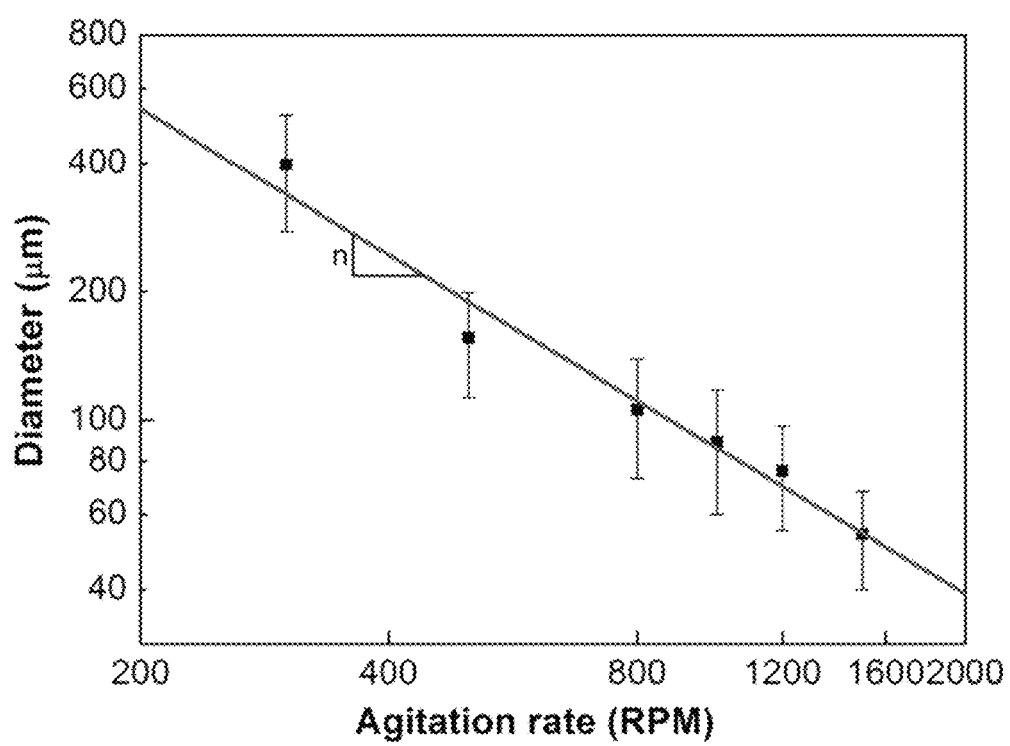
FIG. 1b shows a plot of the average diameter of the prepared PUF microcapsules of this embodiment of the invention as a function of the agitation rate (n=1.14).

For a microcapsules based self-healing system, the diameter of embedded capsules greatly influences the healing performance. In the present study, the influence of agitation rate on the diameter of resultant microcapsules was investigated. It has been found that the average diameter of microcapsules reduced from about 400 μm to about 40 μm when the agitation rate was raised from 300 RPM to 1500 RPM, respectively. This observation demonstrated that the increase of agitation rate would result in smaller microcapsules. Actually, as shown in FIG. 1b, the mean diameter of resultant microcapsules exhibited linear relation to the agitation rate in double logarithm coordinates, and this result is in agreement with previous research (E. Brown, M. Kessler, N. Sottos, S. White, Journal of Microencapsulation 2003, 20, 719; J. Yang, M. W. Keller, J. S. Moore, S. R. White, N. R. Sottos, Macromolecules 2008, 41, 9650)

Since the synthesis of the capsule shell wall is not a strict stoichiometric reaction, and most of toluene evaporates away during the heated reaction process, the yield of the synthesis is simply calculated by the ratio of the mass of the collected microcapsules to the total mass of POTS, urea, ammonium chloride and resorcinol, while the mass of toluene is ignored. Based on this calculation, the yield of synthesis was around 67 wt %.

Figure 1C:
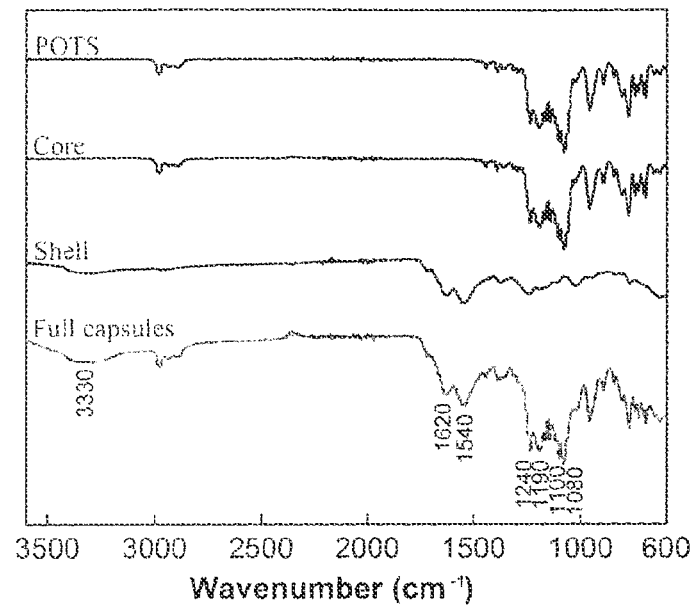
FIG. 1c shows Fourier Transform Infrared Spectroscopy (FTIR) spectra of POTS, capsule core, capsule shell and full microcapsules.

The components of prepared microcapsules were determined from Fourier transform infrared spectroscopy (FTIR) analysis. As shown in FIG. 1c, the spectrum of full capsule contains signals at 3330 $cm^{-1}$ (O—H and N—H stretching), 1620 $cm^{-1}$ (C=O stretching) and 1540 $cm^{-1}$ (N—H bending), indicating the formation of PUF from the polymerization reaction between urea and formaldehyde. A simple comparison between the spectra of full microcapsule and capsule shell clearly shows that POTS is absent in the shell part. In the meantime, it can be seen that the spectrum of capsule core is identical to that of pure POTS, indicating the successful encapsulation of POTS as core material.

Figure 1D:
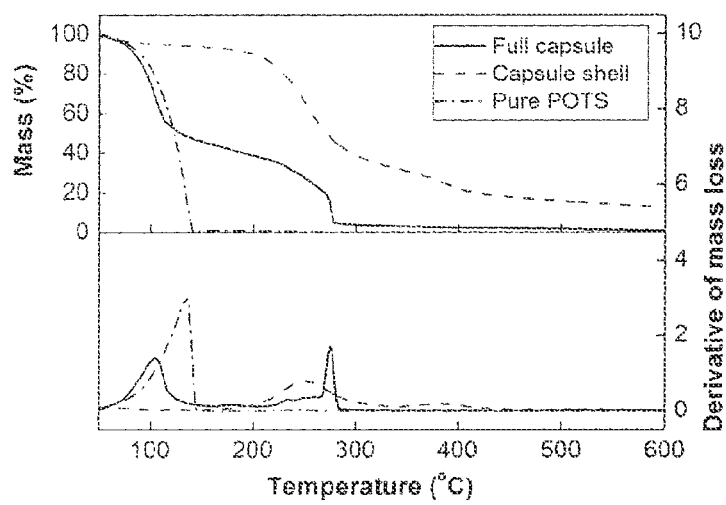
FIG. 1d shows the thermogravimetric analysis (TGA) weight loss curve and the derivative of weight loss curve of pure POTS ("dotted line"), capsule shell ("discontinuous line") and full microcapsules (continuous line)

The thermal property and core fraction of microcapsules were characterized by using thermogravimetric analysis (TGA). The TGA weight loss curves of the synthesized microcapsules along with pure POTS and capsule shell material as a function of temperature were shown in FIG. 1d. It can be seen that microcapsules experienced significant weight loss from approximately 100° C., which is attributed to the evaporation of encapsulated POTS. The decomposition of shell materials started from about 200° C. From the peak width of the derivative curve as shown in FIG. 1d, the core fraction of the microcapsules was determined to be around 60% when the agitation was at 800 RPM.

A self-healing anticorrosive epoxy coating was prepared by mixing synthesized microcapsules into epoxy resin that was coated on the steel substrate. The cured epoxy coating was manually scribed to expose the substrate and then immersed into 10 wt.-% sodium chloride (NaCl) solution to evaluate the self-healing and anti-corrosion performance. It can be seen from FIG. 2a that the scratched area of the steel panel coated with self-healing coating was nearly free of corrosion after 48 h immersion in salt solution. On contrary, severe corrosion was seen in the control specimen (FIG. 2b). This result clearly demonstrated the excellent corrosion protection of the prepared coating towards steel panel under the accelerated corrosion condition.

The scratched regions of both self-healing coating and control coating were inspected under SEM. It is clear that the cut of the self-healing coating was filled with newly formed materials after immersion (FIG. 2c). The cut was in this way sealed to retard the attack of corrosive salt solution and thus protect the substrate from corrosion. As a comparison, it could be seen that the cut of the control specimen was still open (FIG. 2d).

Figure 2E:
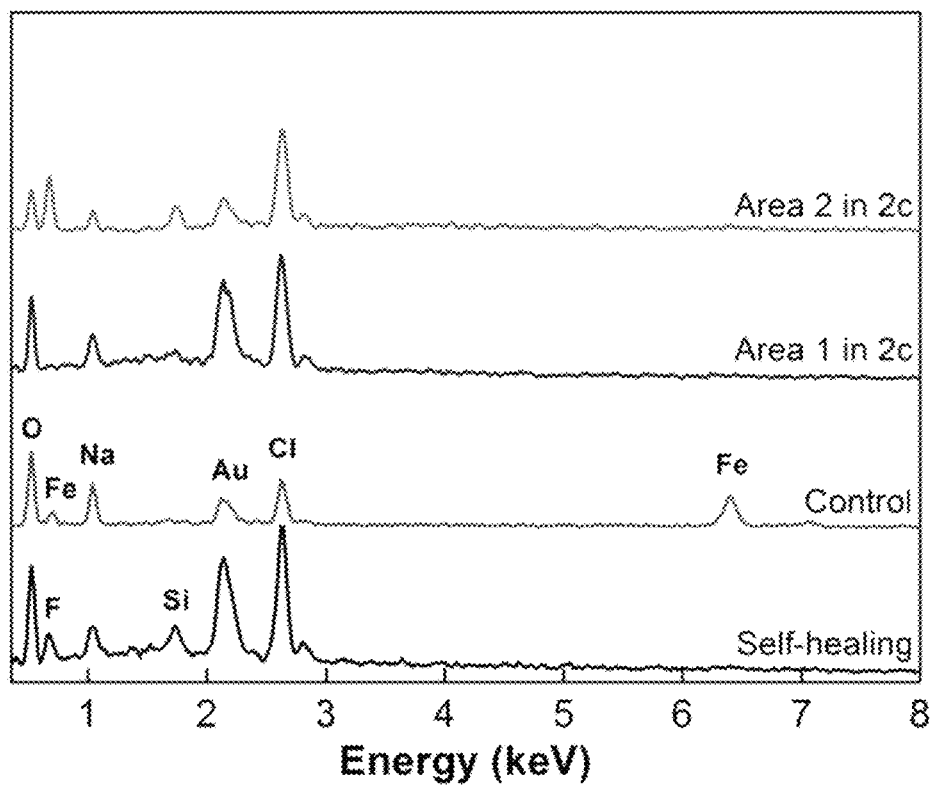
FIG. 2e depicts Energy-dispersive X-ray spectroscopy (EDX) analysis of the self-healing coating as shown in FIG. 2c and of the control coating as shown in FIG. 2d after immersion.

In order to further reveal the underlying mechanism for the self-healing anticorrosion behavior, electron dispersive X-ray (EDX) analysis was performed to the scribed area of the coating surface to identify the elements distribution. Herein elements silicon (Si) and fluorine (F) were the focus of EDX analysis because POTS was the sole source for them in the system. If the newly formed materials in the scribes as shown in FIG. 2c were from encapsulated POTS, elements Si and F should be detected in the scribed area of the self-healing coating while absent in neat epoxy coating. From FIG. 2e, it is seen that the scribed area of the control coating afforded elements O, Na, Cl, Au and Fe. Considered that the epoxy polymeric coating itself contains O, a layer of gold was sputtered on the coating surface to perform the EDX analysis, and the specimen was immersed in NaCl solution, the presence of O, Na, Cl and Au is natural, while the element Fe was from the steel substrate. On the contrary, for the self-healing coating, it is seen that no detectable Fe was found at the scribed area instead, elements Si and F were detected. It meant that the scribe of the self-healing coating was covered by a layer of material that contains elements Si and F. In the meantime, it is observed that Si and F were not detected at the intact area (Area 1 in FIG. 2c) of the self-healing coating. It suggested that elements Si and F could not be detected from the self-healing coating if the embedded POTS-filled microcapsules were not ruptured, even though POTS was indeed stored in the coating matrix. From these two aspects, it can be concluded that the elements Si and F within the scribed area were from ruptured microcapsules. As a matter of fact, this conclusion can be further solidified by a direct analysis to the new materials generated within the scribed area (Area 2 in FIG. 2c) of the self-healing coating. As shown in FIG. 2e, the presence of Si and F is obvious in the newly formed materials within the crack when Area 2 was scanned. Hence, it can be concluded that the newly generated materials in the scribes of the self-healing coating were from encapsulated POTS.

Figure 3B:
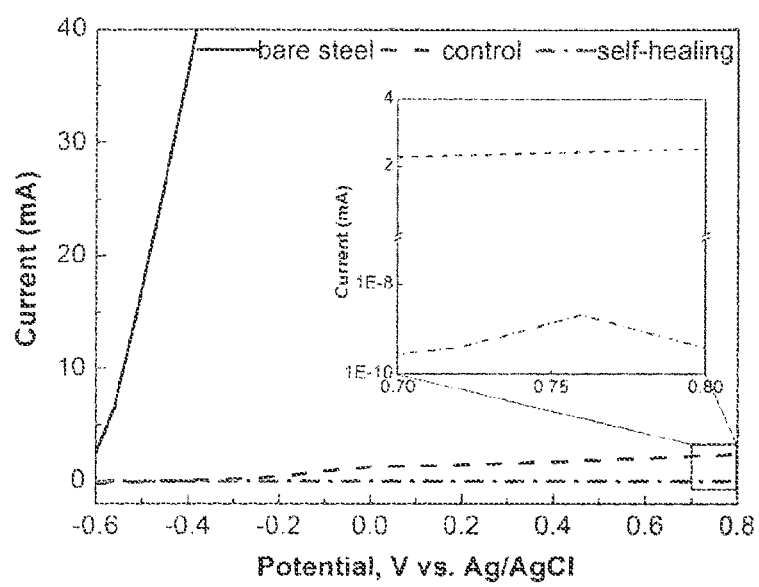
FIG. 3b shows the electrochemical test result for a bare steel panel (continuous line), a scribed control (broken line) and a self-healed specimen of a coating of the invention (dotted line).

The self-healing behavior of the POTS filled coating was further demonstrated by an electrochemical test when the immersion procedure was completed. A conventional three-electrode electrode system was used for the test, while the coated steel substrate served as the working electrode (FIG. 3a). When potential was applied, the current passing through the coating was recorded. As shown in FIG. 3b, for the scribed self-healing coating, the current passing through the coating was almost zero ampere (~2 pA). By comparison, current passing through the scribed control coating was 3 mA, and the bare steel panel exhibited very high current flow. This significantly different electrochemical behavior of the self-healing and control samples clearly illustrated that the scribes of the self-healing coating were autonomously re-sealed during the immersion process, while the ones of the control specimen were still open.

Figure 3C:
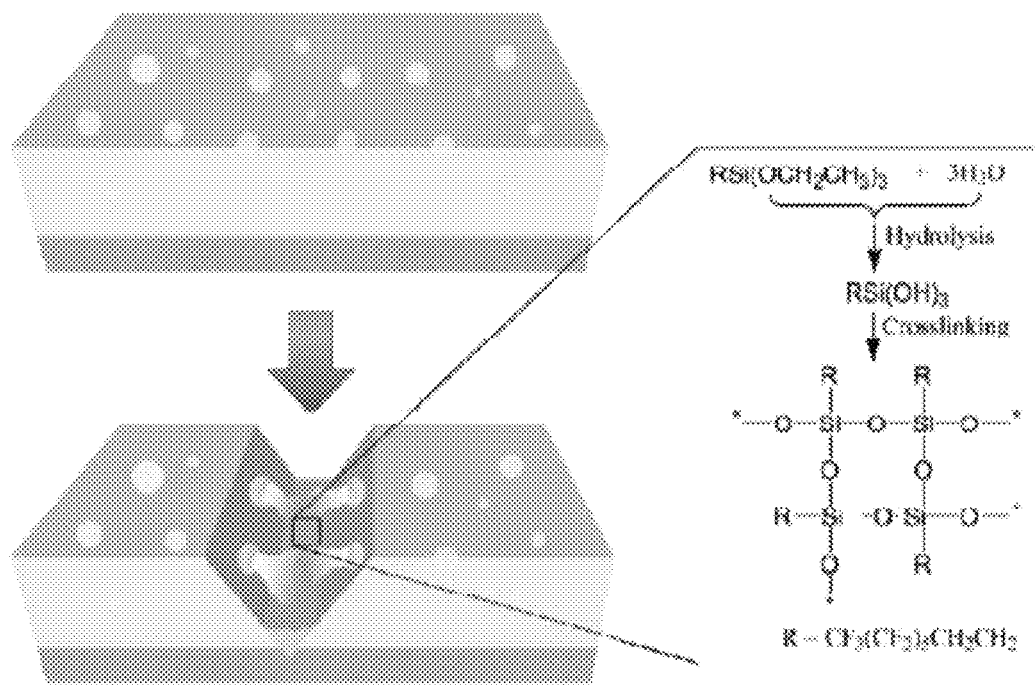
FIG. 3c illustrates schematically the anticorrosion mechanism of a scratched and intact anticorrosive coatings of the invention using a trialkoxyysilane (the same hydrolysis mechanism take place in case a chlorosilane such as 2-(Perfluorooctyl)ethyltrichlorosilane (cf.
Figure 4A:
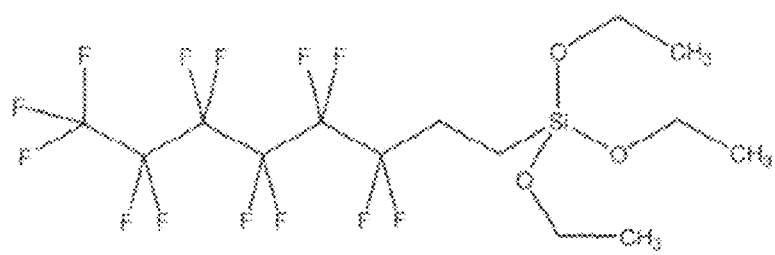
FIG. 4a shows 1H,1H,2H,2H-perfluorooctyltriethoxysilane (POTS)
Figure 4B:
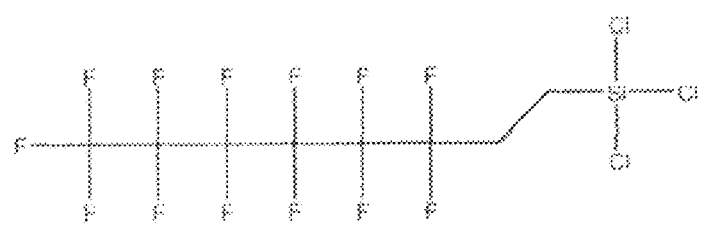
FIG. 4b shows 2-(Perfluorooctyl)ethy)trichlorosilane.
Figure 4C:
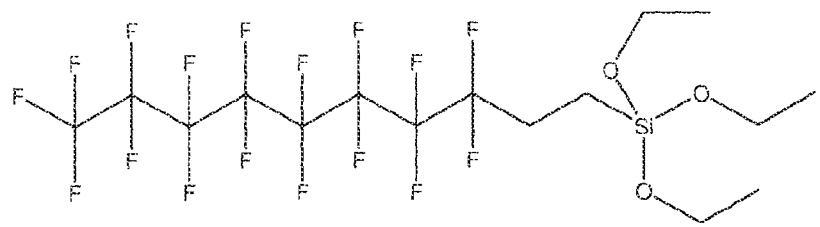
FIG. 4c depicts 1H,1H,2H,2H-perfluorodecyl-triethoxysilane.
Figure 4D:
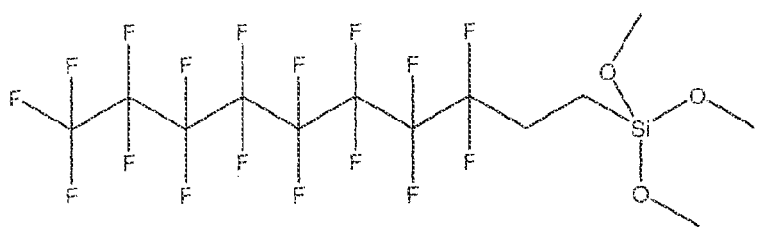
FIG. 4d shows 1H,1H,2H,2H-Perfluorodecyltrimethoxysilane.
Figure 4E:
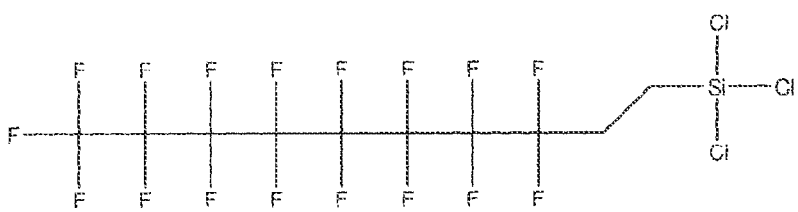
FIG. 4e depicts 1H,2H,2H-Perfluorodecyltrichlorosilane.
Figure 4F:
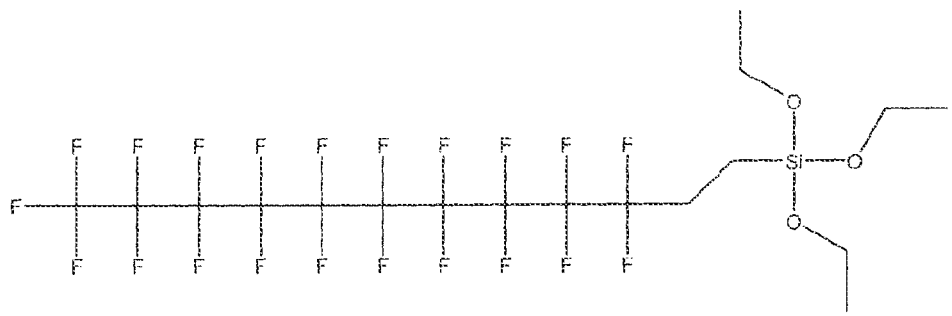
FIG. 4f depicts 1H,1H,2H,2H-perfluorododecyl-triethoxysilane.
Figure 4G:
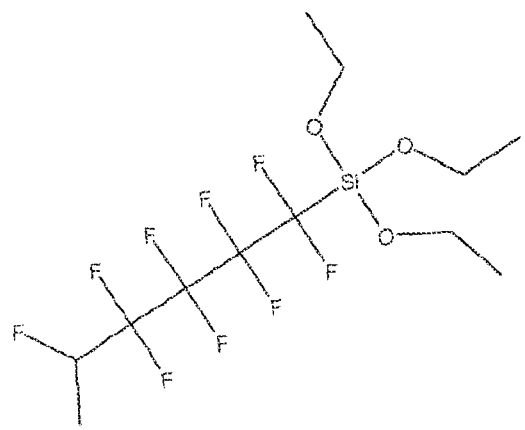
FIG. 4g depicts (1,1,2,2,3,3,4,4,5- nonafluorohexyl)triethoxysilane.
Figure 4H:
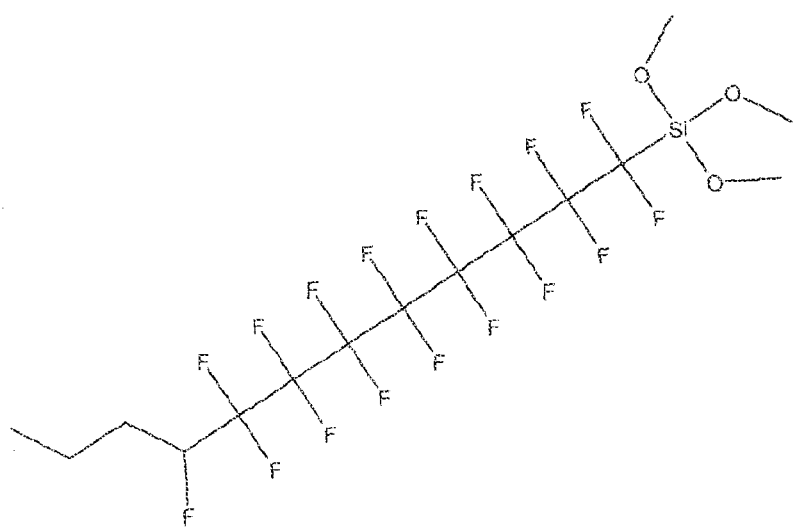
FIG. 4h depicts (1,1,2,2,3,3,4,4,5,5,6,6,7,7,8,8,9-heptadecafluorododecyl)trimethoxysilane.
Figure 4I:
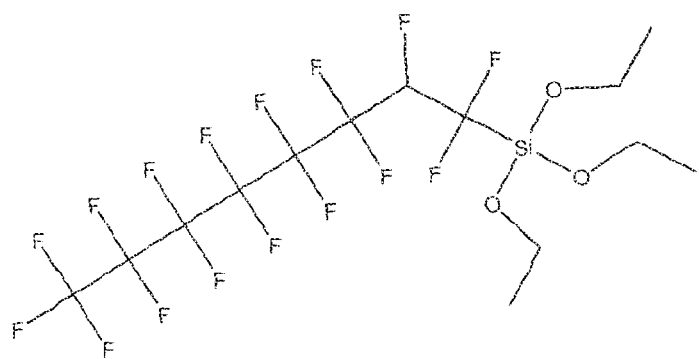
FIG. 4i depicts (1,1,2,3,3,4,4,5,5,6, 6,7,7,8,8,8-hexadecafluorooctyl)triethoxysilane
Figure 4J:
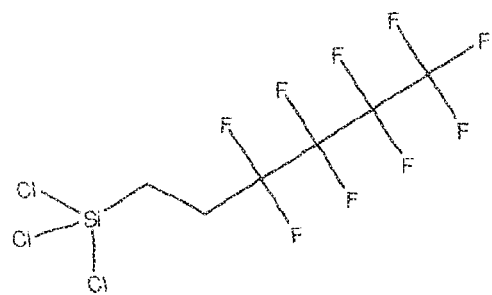
FIG. 4j depicts (3,3,4,4,5,5,6,6,6-nonafluorohexyl)trichlorosilane.

Based on the results as discussed above, the mechanism of corrosion resistant behavior of the prepared POTS-based coating can be hence proposed. As illustrated in FIG. 3c, when the coating was scribed, embedded microcapsules were ruptured and the stored POTS liquid was released. Upon contact with water in solution or moisture in air. POTS undergoes hydrolysis and poly-condensation reactions to produce a silane-based material depositing at the scribed area. The sealed damage separates the underneath steel substrate from external corrosive environment and thus exhibits excellent corrosion protection function. This re-sealing process occurs autonomously without any human intervention.

The anticorrosive coating was based on microencapsulated POTS liquid, and it displayed excellent corrosion protection ability to steel substrates via a fully self-healing mechanism. The self-healing behavior was realized under ambient condition, and it did not require any manual intervention such as heating or UV exposure, making it promising for the development of catalyst-free, one-part self-healing materials, which is of considerable technical and commercial importance. The POTS-filled PUF microcapsules were synthesized via in-situ polymerization reaction in an oil-in-water emulsion, and the diameter of the resultant microcapsules can be monitored by adjusting the agitation rate during the synthesis.

The invention illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed is:

1. A poly(urea-formaldehyde) microcapsule, the poly(urea-formaldehyde) microcapsule comprising encapsulated within the microcapsule an organofluorine silane of the general formula (I) $A_3C(CA_2)_pSiR^1_yX_{(3-y)}$ (I), wherein in formula (I) A is either fluorine (F) or hydrogen (H), wherein at least about 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 1 or 2 and p=0 to 20.

2. The poly(urea-formaldehyde) microcapsule of claim 1, wherein the silane has the general formula $F_3C(CF_2)_m(CH_2)_n SiR^1_yX_{(3-y)}$ (II),
wherein in formula (II) X is chloro or a group RO and R is a linear or branched alkyl radical of 1 to 4 carbon atoms, $R^1$ is a linear, branched or cyclic alkyl group of 1 to 8 carbon atoms, n=0, 1 or 2, y=0 or 1 or 2 and m=0 to 18.

3. The poly(urea-formaldehyde) microcapsule of claim 2, wherein in formula (II) m=4 to 16, n is 0, 1, or 2 and y=0, 1 or 2.

4. The poly(urea-formaldehyde) microcapsule of claim 1, wherein the organofluorine-functional silane is 1H, 1H, 2H, 2H-perfluorooctyltriethoxysilane (POTS), 1H, 1H, 2H, 2H-perfluorooctyltrimethoxysilane, 1H, 1H, 2H, 2H-Perfluorodecyltriethoxysilane; 1,1,2,2,3,3,4,4,5,5,6,6,7,7,8,8,9-heptadecafluorododecyl(trimethoxy)silane, 1,1,2,2,3,3,4,4,5,5,6,6,7,7,8,8,9-heptadecafluorododecyl(triethoxy)silane, triethoxy (1,1,2,3,3,4,4,5,5,6,6,7,7,8,8,8-hexadecafluorooctyl)silane, trimethoxy (1,1,2,3,3,4,4,5,5,6,6,7,7,8,8,8-hexadecafluorooctyl)silane, 1H, 1H 2H, 2H-perfluorooctyltrichlorosilane, 1H, 1H, 2H, 2H-Perfluorodecyltrichlorosilane or a mixture thereof.

5. The poly(urea-formaldehyde) microcapsule of claim 1, wherein the microcapsule is made by polymerization of urea with formaldehyde, or wherein the microcapsule is made by polymerization of a mixture of melamine and urea with formaldehyde.

6. The poly(urea-formaldehyde) microcapsule of claim 1, wherein the microcapsule has a diameter between about 10 μm to about 500 μm.

7. A method of preventing or slowing corrosion, the method comprising applying a coating composition on a substrate, wherein the coating composition comprises poly (urea-formaldehyde) microcapsules as defined in claim 1.

8. The method of claim 7, wherein the coating composition comprises a curable resin.

9. The method of claim 8, wherein the curable resin is selected from the group consisting of an epoxy resin, an acrylic resin, a phenolic resin, a polyurethane resin, an alkyd resin and a polyester resin.

10. The method of claim 9, further comprising curing the coating composition.

11. The method of claim 7, wherein the poly (urea-formaldehyde) microcapsules are present in the coating composition in about 1% (w/w) to about 25% (w/w).

12. A method of encapsulating an organofluorine silane of the general formula (I) $A_3C(CA_2)_p SiR^1_y X_{(3-y)}$ (I), in which A is either fluorine (F) or hydrogen (H), wherein at least 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 1 or 2 and p=0 to 20 in a polymer microcapsule, the method comprising forming an oil-in-water emulsion containing a mixture of urea and the organofluorine silane of the general formula (I), adding formaldehyde to the oil-in-water emulsion, and polymerizing urea and formaldehyde by in-situ polymerization to form the polymeric microcapsule, thereby encapsulating the organofluorine silane of the general formula (I) in the formed polymeric microcapsule.

13. The method of claim 12, wherein forming the oil-in-water emulsion comprises adding urea and the organofluorine silane of the general formula (I) to an aqueous solution containing a surfactant.

14. The method of claim 13, wherein the surfactant is ethylene maleic anhydride (EMA) copolymer or gum arabic.

15. A coating composition comprising poly(urea-formaldehyde) microcapsules, the poly (urea-formaldehyde) microcapsule comprising an organofluorine silane of the general formula (I) $A_3C(CA_2)_p SiR^1_y X_{(3-y)}$ (I), in which A is either fluorine (F) or hydrogen (H), wherein at least about 50% of atoms A are fluorine, X is chloro or a group RO, wherein R is a linear or branched alkyl radical of 1 to 4 carbon atoms, $R^1$ is a linear, branched or cyclic alkyl group of 1 to 8 carbon atoms, y=0 or 2 nd p=0 to 20, encapsulated within the microcapsule.

16. The coating composition of claim 15, wherein the coating composition comprises a curable resin.

17. The coating composition of claim 16, wherein the curable resin is selected from the group consisting of an epoxy resin, an acrylic resin, a phenolic resin, a polyurethane resin, an alkyd resin and a polyester resin.

18. The coating composition of claim 15, wherein the poly (urea-formaldehyde) microcapsules are present in the coating composition in about 1% (w/w) to about 25% (w/w).

* * * * *